US010555230B2

(12) United States Patent
Li et al.

(10) Patent No.: US 10,555,230 B2
(45) Date of Patent: Feb. 4, 2020

(54) V2X MESSAGE SENDING METHOD, APPARATUS, AND SYSTEM

(71) Applicant: Huawei Technologies Co., Ltd., Shenzhen (CN)

(72) Inventors: Mingchao Li, Beijing (CN); Zhenzhen Cao, Beijing (CN); Xiao Xiao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/264,229

(22) Filed: Jan. 31, 2019

(65) Prior Publication Data
US 2019/0166533 A1 May 30, 2019

Related U.S. Application Data

(63) Continuation of application No. PCT/CN2016/094242, filed on Aug. 9, 2016.

(51) Int. Cl.
*H04W 36/08* (2009.01)
*H04W 4/40* (2018.01)
(Continued)

(52) U.S. Cl.
CPC ............. *H04W 36/08* (2013.01); *H04W 4/40* (2018.02); *H04W 56/001* (2013.01); *H04W 74/0816* (2013.01); *H04W 76/27* (2018.02)

(58) Field of Classification Search
CPC ....... H04W 36/08; H04W 4/40; H04W 76/27; H04W 56/001; H04W 74/0816
See application file for complete search history.

(56) References Cited

U.S. PATENT DOCUMENTS

2015/0271861 A1 9/2015 Li et al.
2015/0282210 A1* 10/2015 Li .................... H04W 76/14
455/436

(Continued)

FOREIGN PATENT DOCUMENTS

CN 104113851 A 10/2014
CN 104754748 A 7/2015
(Continued)

OTHER PUBLICATIONS

Fujitsu, "Discussion on Resource Pool for PC5 Based V2V," 3GPP TSG RAN WG1 Meeting #85, R1-164323, May 23-27, 2016, 7 pages, Nanjing, China.
(Continued)

*Primary Examiner* — Wayne H Cai
(74) *Attorney, Agent, or Firm* — Slater Matsil, LLP

(57) ABSTRACT

Embodiments of the present invention provide a V2X message sending method, apparatus, and system, and relate to the field of Internet of Vehicles. The method includes: obtaining, by a terminal, first configuration information, where the first configuration information is used for determining a first transmission resource pool; determining the first transmission resource pool based on the first configuration information; selecting a first transmission resource from the first transmission resource pool in a first transmission resource obtaining manner when a preset condition is met; and sending a V2X message by using the first transmission resource.

14 Claims, 6 Drawing Sheets

(51) Int. Cl.
*H04W 76/27* (2018.01)
*H04W 56/00* (2009.01)
*H04W 74/08* (2009.01)

(56) References Cited

U.S. PATENT DOCUMENTS

| | | |
|---|---|---|
| 2016/0057604 A1 | 2/2016 | Luo et al. |
| 2016/0323869 A1 | 11/2016 | Xu et al. |
| 2017/0019822 A1 | 1/2017 | Zhao et al. |
| 2018/0192397 A1* | 7/2018 | Seo .................. H04W 72/02 |
| 2019/0075447 A1* | 3/2019 | Lee .................. H04W 4/02 |

FOREIGN PATENT DOCUMENTS

| | | |
|---|---|---|
| CN | 104936164 A | 9/2015 |
| CN | 105307220 A | 2/2016 |
| WO | 2016021202 A1 | 2/2016 |

OTHER PUBLICATIONS

ZTE, "SA Decoding and Energy Measurement in V2V," 3GPP TSG-RAN WG1 Meeting #85, R1-164959, May 23-27, 2016, 6 pages, Nanjing, China.

NTT Docomo, "Discussion on Resource Pool for PC5 Based V2V Communications," 3GPP TSG RAN WG1 Meeting #85, R1-165195, May 23-27, 2016, 4 pages, Nanjing, China.

"3rd Generation Partnership Project: Technical Specification Group Radio Access Network; Evolved Universal Terrestrial Radio Access (E-UTRA) and Evolved Universal Terrestrial Radio Access Network (E-UTRAN); Overall Description; Stage 2 (Release 13)," 3GPP TS 36.300 V13.4.0, Jun. 2016, 310 pages.

"3rd Generation Partnership Project; Technical Specification Group Radio Access Network; Evolved Universal Terrestrial Radio Access (E-UTRA); Radio Resource Control (RRC); Protocol Specification (Release 13)," 3GPP TS 36.331 V13.2.0, Jun. 2016, 623 pages.

R2-162290 Huawei, HiSilicon, "Sidelink resource configuration during handover", 3GPP TSG-RAN WG2 #93bis, Dubrovnik, Croatia, Apr. 11-15, 2016, 3 pages.

* cited by examiner

V2X MESSAGE SENDING METHOD, APPARATUS, AND SYSTEM

CROSS-REFERENCE TO RELATED APPLICATIONS

This application is a continuation of International Application No. PCT/CN2016/094242, filed on Aug. 9, 2016, the disclosure of which is hereby incorporated by reference in its entirety.

TECHNICAL FIELD

Embodiments of the present invention relate to the field of Internet of Vehicles, and in particular, to a V2X message sending method, apparatus, and system.

BACKGROUND

In an Intelligent Transportation System (ITS), various types of information related to transportation are obtained in a timely manner through vehicle to vehicle (V2V) communication, vehicle to infrastructure (V2I) communication, vehicle-to-pedestrian (V2P) communication, or vehicle-to-network (V2N) communication. These communication manners may be collectively referred to as vehicle to X (V2X) communication. X is a collective term for vehicles, road infrastructure, pedestrians, and networks.

When a V2X message is transmitted using a Long Term Evolution (LTE) technology, two user equipments (UE) may be directly connected to each other for communication. When the two UEs are directly connected to each other for communication, an eNB first configures a transmission resource pool for the UE. The UE selects a transmission resource in an idle state from the transmission resource pool in a manner in which a transmission resource is selected after channel sensing is performed. Then, the UE sends the V2X message by using the transmission resource in the idle state. The manner in which a transmission resource is selected after channel sensing is performed is as follows. The UE senses each transmission resource in the transmission resource pool, where a typical value of sensing duration is 1000 ms; and then determines the transmission resource in the idle state based on a sensing result.

In the foregoing manner, the transmission resource in the idle state can be selected only after at least 1000-ms sensing duration. Therefore, the manner is not applicable to all V2X message sending scenarios. In some specific sending scenarios, for example, after the UE initially obtains configuration information of the transmission resource pool, even though there is a to-be-transmitted V2X message, the UE needs to wait for the 1000-ms sensing duration, and then select the transmission resource in the idle state to send the V2X message. Because a transmission delay of the V2X message is 100 ms or 20 ms, the UE may fail to send the V2X message after waiting for the 1000-ms sensing duration.

SUMMARY

To resolve a problem with the current system that a manner of selecting a transmission resource cannot be applied to all V2X message sending scenarios, and V2X message sending may fail in a specific sending scenario, embodiments of the present invention provide a V2X message sending method, apparatus, and system. The technical solutions are as follows:

According to a first aspect of the embodiments of the present invention, a V2X message sending method is provided. The method includes obtaining, by a terminal, first configuration information. The first configuration information is used for determining a first transmission resource pool. The method further includes determining, by the terminal, the first transmission resource pool based on the first configuration information. The method further includes selecting, by the terminal, a first transmission resource from the first transmission resource pool in the first transmission resource obtaining manner when determining that a preset condition is met. The method further includes sending a V2X message by using the first transmission resource.

In this design, it can be ensured that the V2X message is normally transmitted in a specific sending scenario when the preset condition is met.

In a possible design, the specific sending scenario is a scenario in which cell handover is performed on the terminal, and the obtaining, by a terminal, first configuration information includes receiving, by the terminal, radio resource control (RRC) dedicated signaling sent by a first access network device; and obtaining, by the terminal, cell handover configuration information and the first configuration information from the RRC dedicated signaling. The cell handover configuration information and the first configuration information are configured by a second access network device. After the obtaining, by a terminal, first configuration information, the method further includes handing over the terminal from a source cell to a target cell based on the cell handover configuration information. The first access network device is an access network device corresponding to the source cell, and the second access network device is an access network device corresponding to the target cell.

In a possible design, the preset condition includes a current moment belongs to a handover time period, a start time of the handover time period is a time at which the RRC dedicated signaling is received, and an end time of the handover time period is a time at which the terminal is handed over to the target cell.

In this implementation, it can be ensured that the V2X message is normally transmitted in a cell handover scenario.

In a possible design, before the selecting, by the terminal, a transmission resource from the first transmission resource pool in a first transmission resource obtaining manner when determining that a preset condition is met, the method further includes obtaining, by the terminal, second configuration information. The second configuration information is used for determining a second transmission resource pool, a manner of obtaining a transmission resource from the second transmission resource pool is a second transmission resource obtaining manner. The second transmission resource obtaining manner is a transmission resource obtaining manner in which a transmission resource is selected after channel sensing is performed for sensing duration T2. The method further includes determining, by the terminal, the second transmission resource pool based on the second configuration information.

In a possible design, the preset condition includes at least one of the following conditions: no valid sensing result is obtained from the second transmission resource pool; sensing duration in the second transmission resource pool is less than T2; after the second configuration information is updated, sensing duration in the second transmission resource pool is less than T2; synchronization between the terminal and the access network device becomes invalid; after a synchronization source is updated, sensing duration in the second transmission resource pool is less than T2 based on a clock of an updated synchronization source; a difference between a time at which the V2X message is generated and a time at which the second configuration information is obtained is less than a preset threshold; or no transmission resource in an idle state is sensed in the second transmission resource pool.

In this implementation, it can be ensured that the V2X message is normally transmitted in a scenario in which no valid sensing result is obtained from the second transmission resource pool.

In a possible design, the method further includes when obtaining a valid sensing result from the second transmission resource pool, obtaining, by the terminal, a second transmission resource from the second transmission resource pool in the transmission resource obtaining manner in which a transmission resource is selected after channel sensing is performed for sensing duration T2, and sending the V2X message by using the second transmission resource.

In a possible design, the first transmission resource pool and the second transmission resource pool are a same resource pool, and the first transmission resource obtaining manner is different from the second transmission resource obtaining manner.

In a possible design, the obtaining, by a terminal, first configuration information includes: obtaining, by the terminal, the preconfigured first configuration information; receiving, by the terminal, radio resource control RRC dedicated signaling sent by the access network device, and obtaining the first configuration information from the RRC dedicated signaling; or receiving, by the terminal, system information sent by the access network device, and obtaining the first configuration information from the system information.

In a possible design, the first transmission resource obtaining manner includes at least one of the following manners: a random selection manner; a manner in which a transmission resource is selected after channel sensing is performed for sensing duration T1, where the sensing duration T1 is less than a transmission delay value of the V2X message; or a carrier sense multiple access with collision avoidance CSMA/CA manner.

According to a second aspect of the embodiments of the present invention, a V2X message sending method is provided, and the method includes: sending, by an access network device, first configuration information to a terminal, where the first configuration information is used for determining a first transmission resource pool. The terminal is configured to: determine the first transmission resource pool based on the first configuration information; when determining that a preset condition is met, select a first transmission resource from the first transmission resource pool in a first transmission resource obtaining manner; and send a V2X message by using the first transmission resource.

In a possible design, the access network device is a first access network device, and the first access network device is an access network device corresponding to a source cell. The sending, by an access network device, first configuration information to a terminal includes: when cell handover needs to be performed on the terminal, sending, by the first access network device, a handover request message to a second access network device, where the second access network device is an access network device corresponding to a target cell. The sending further includes receiving, by the first access network device, a handover acknowledgement message sent by the second access network device, where the handover acknowledgement message includes cell handover configuration information and the first configuration information. The sending further includes sending, by the first access network device, RRC dedicated signaling to the terminal, where the RRC dedicated signaling includes the cell handover configuration information and the first configuration information. The terminal is configured to: be handed over from the source cell to the target cell based on the cell handover configuration information, select the first transmission resource from the first transmission resource pool in the first transmission resource obtaining manner within a handover time period, and send the V2X message by using the first transmission resource.

In a possible design, the method further includes: sending, by the first access network device, second configuration information to the terminal, where the second configuration information is used for configuring a second transmission resource pool. A second transmission resource obtaining manner is used for the second transmission resource pool, and the second transmission resource obtaining manner is a transmission resource obtaining manner in which a transmission resource is selected after channel sensing is performed for sensing duration T2.

In a possible design, the method further includes sending, by the access network device, RRC dedicated signaling to the terminal, where the RRC dedicated signaling carries the first configuration information. Alternatively, the method includes sending, by the access network device, system information (SI) to the terminal, where the system information carries the first configuration information.

According to a third aspect of the embodiments of the present invention, a message sending method is provided. The method includes receiving, by a second access network device, a handover request message sent by a first access network device, where the handover request message is sent by the first access network device when cell handover needs to be performed on a terminal, and the first access network device is an access network device corresponding to a source cell. The method includes sending, by the second access network device, a handover request response message to the first access network device, where the handover request response message carries cell handover configuration information and first configuration information. The method includes the first access network device is configured to send RRC dedicated signaling to the terminal, where the RRC dedicated signaling includes the cell handover configuration information and the first configuration information. The terminal is configured to: be handed over from the source cell to a target cell based on the cell handover configuration information, select a first transmission resource from the first transmission resource pool in the first transmission resource obtaining manner within a handover time period, and send a V2X message by using the first transmission resource.

In a possible design, the first transmission resource obtaining manner includes any one of the following manners: a random selection manner; a manner in which a transmission resource is selected after channel sensing is performed for sensing duration T1, where the sensing duration T1 is less than a transmission delay value of the V2X message; or a carrier sense multiple access with collision avoidance CSMA/CA manner.

According to a fourth aspect, an embodiment of the present invention provides a V2X message sending apparatus. The message sending apparatus includes at least one unit, and the at least one unit is configured to implement the V2X message sending method provided in any one of the first aspect or the possible implementations of the first aspect.

According to a fifth aspect, an embodiment of the present invention provides a V2X message sending apparatus. The message sending apparatus includes at least one unit, and the at least one unit is configured to implement the V2X message sending method provided in any one of the second aspect or the possible implementations of the second aspect.

According to a sixth aspect, an embodiment of the present invention provides a V2X message sending apparatus. The message sending apparatus includes at least one unit, and the at least one unit is configured to implement the V2X message sending method provided in any one of the third aspect or the possible implementations of the third aspect.

According to a seventh aspect, an embodiment of the present invention provides a terminal. The terminal includes a processor and a memory. The processor is configured to store one or more instructions. The instructions are instructed to be executed by the processor. The processor is configured to implement the message sending method provided in any one of the first aspect or the possible implementations of the first aspect.

According to an eighth aspect, an embodiment of the present invention provides an access network device. The access network device includes at least one unit, and the at least one unit is configured to implement the V2X message sending method provided in any one of the second aspect or the possible implementations of the second aspect.

According to a ninth aspect, an embodiment of the present invention provides a second access network device. The second access network device includes at least one unit, and the at least one unit is configured to implement the V2X message sending method provided in any one of the third aspect or the possible implementations of the third aspect.

According to a tenth aspect, an embodiment of the present invention provides a computer readable storage medium. The computer readable storage medium stores an executable program used for implementing the V2X message sending method provided in any one of the first aspect or the possible designs of the first aspect.

According to an eleventh aspect, an embodiment of the present invention provides a computer readable storage medium. The computer readable storage medium stores an executable program used for implementing the V2X message sending method provided in any one of the second aspect or the possible designs of the second aspect.

According to a twelfth aspect, an embodiment of the present invention provides a computer readable storage medium. The computer readable storage medium stores an executable program used for implementing the V2X message sending method provided in any one of the third aspect or the possible designs of the third aspect.

According to a thirteenth aspect, a V2X message sending system is provided. The V2X message sending system includes a terminal and an access network device. The terminal includes the V2X message sending apparatus provided in any one of the fourth aspect or the possible designs of the fourth aspect, and the access network device includes the V2X message sending apparatus provided in any one of the fifth aspect or the possible designs of the fifth aspect.

According to a fourteenth aspect, a V2X message sending system is provided. The message sending system includes a terminal and an access network device. The terminal includes the message sending apparatus provided in any one of the seventh aspect or the possible designs of the seventh aspect, and the access network device includes the V2X message sending apparatus provided in any one of the eighth aspect or the possible designs of the eighth aspect.

According to a fifteenth aspect, a V2X message sending system is provided. The V2X message sending system includes a terminal, a first access network device, and a second access network device. The terminal includes the V2X message sending apparatus provided in any one of the fourth aspect or the possible designs of the fourth aspect, the first access network device includes the V2X message sending apparatus provided in any one of the fifth aspect or the possible designs of the fifth aspect, and the second access network device includes the V2X message sending apparatus provided in any one of the fifth aspect or the possible designs of the fifth aspect.

According to a sixteenth aspect, a V2X message sending system is provided. The V2X message sending system includes a terminal, a first access network device, and a second access network device. The terminal includes the terminal provided in any one of the seventh aspect or the possible designs of the seventh aspect, the first access network device includes the access network device provided in any one of the eighth aspect or the possible designs of the eighth aspect, and the second access network device includes the second access network device provided in any one of the ninth aspect or the possible designs of the ninth aspect.

The technical solutions provided in the embodiments of the present invention have at least the following beneficial effects.

When determining that the preset condition is met, the terminal selects the first transmission resource from the first transmission resource pool in the first transmission resource obtaining manner, to send the V2X message. Duration spent in selecting the transmission resource in the first transmission resource obtaining manner is less than a transmission delay of the V2X message. Therefore, it can be ensured that the V2X message can be normally transmitted in a specific sending scenario when the preset condition is met.

BRIEF DESCRIPTION OF THE DRAWINGS

The following briefly describes the accompanying drawings required for describing the embodiments. Apparently, the accompanying drawings in the following descriptions show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following further describes the embodiments of the present invention in detail with reference to the accompanying drawings.

A "module" mentioned in this specification is a program or an instruction that is stored in a memory and can implement some functions. A "unit" mentioned in this specification is a functional structure divided based on logic. The "unit" may be implemented by only hardware, or implemented by a combination of software and hardware.

"A plurality" mentioned in this specification means at least two. "And/or" describes an association relationship between associated objects and represents that three relationships may exist. For example, A and/or B may represent the following three cases: Only A exists, both A and B exist, and only B exists. The character "/" usually indicates an "or" relationship between the associated objects.

Figure 1:
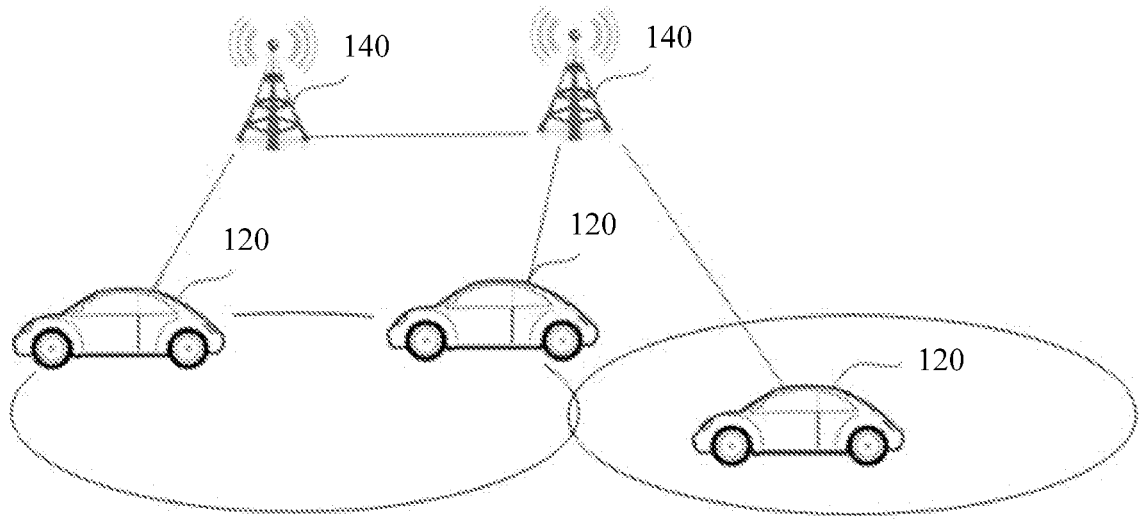
FIG. 1 is a schematic structural diagram of a V2X message sending system according to an embodiment of the present invention.

FIG. 1 is a schematic structural diagram of a message sending system 100 according to an embodiment of the present invention. The message sending system 100 includes at least one terminal 120 and at least one access network device 140.

The terminal 120 is a terminal in the Internet of Vehicles. Optionally, the terminal 120 is at least one of a communications device disposed in a vehicle, a communications device disposed in roadside infrastructure, or a communications device used by a pedestrian. Specifically, the terminal 120 may be a device such as a personal communications service (PCS) phone, a cordless telephone set, a Session Initiation Protocol (SIP) phone, a wireless local loop (WLL) station, or a personal digital assistant (PDA). The terminal may also be referred to as a system, a subscriber unit, a subscriber station, a mobile station, a mobile, a remote station, an access point, a remote terminal, an access terminal, a user terminal, a user agent, a user device, or user equipment.

The terminal 120 communicates with one or more access network devices 140 by using a radio access network (RAN).

The access network device 140 may be a base station, and serves as a router between the terminal 120 and a remaining part of the access network, and the remaining part of the access network may include an Internet Protocol (IP) network. The base station may further coordinate attribute management of an air interface. For example, the base station may be a base transceiver station (BTS) in GSM or CDMA, or may be a NodeB in WCDMA, or may be an evolved NodeB (eNB or e-NodeB) in LTE. This is not limited in this application. An example in which the access network device 140 is the eNB is used for description in the following embodiment.

When V2X communication is implemented between two terminals 120, a first communication manner is as follows: A V2X message sent by one terminal 120 is sent to the other terminal 120 through forwarding by the access network device 140; and a second communication manner is as follows: The two terminals 120 are directly connected to each other for communication. In this embodiment of the present invention, a case in which the two terminals 120 are directly connected to each other for communication is mainly involved.

When the two terminals 120 are directly connected to each other for communication, the access network device 140 preconfigures a transmission resource pool for the terminal 120. The terminal 120 selects a transmission resource in an idle state from the transmission resource pool, and sends the V2X message by using the transmission resource in the idle state.

The V2X message includes at least one of a V2V message, a V2I message, a V2P message, or a V2N message. Optionally, the V2X message is a message carrying V2X data, or the V2X message is V2X data.

Figure 2:
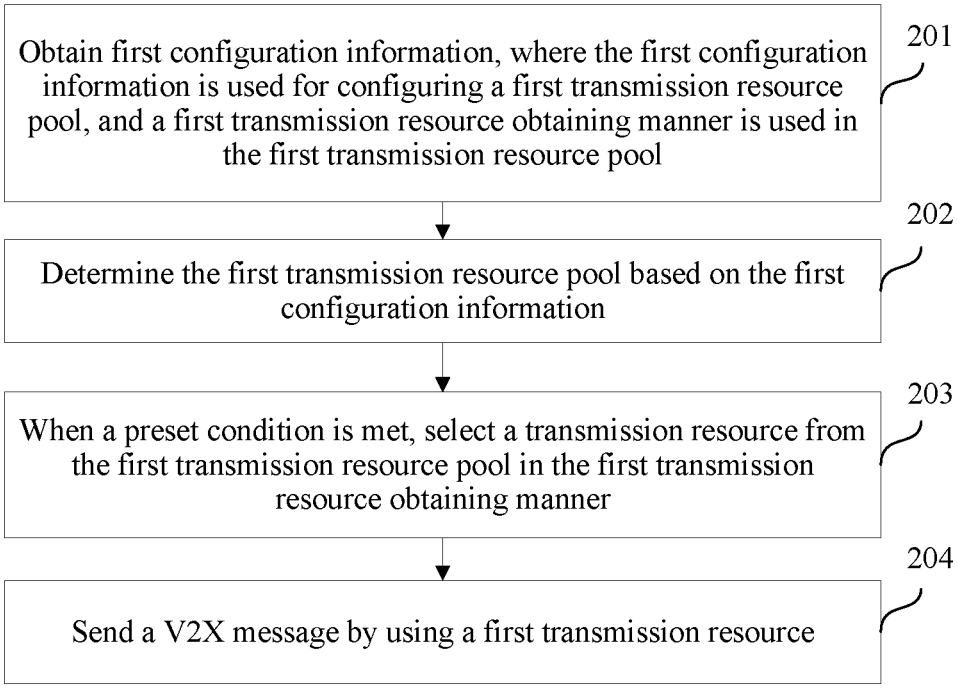
FIG. 2 is a flowchart of a V2X message sending method according to an embodiment of the present invention.

FIG. 2 is a method flowchart of a message sending method according to an embodiment of the present invention. An example in which the message sending method is applied to the terminal 120 shown in FIG. 1 is used for description in this embodiment. The method includes the following steps.

Step 201: Obtain first configuration information, where the first configuration information is used for determining a first transmission resource pool.

Optionally, the first configuration information is configured by an access network device for the terminal. That is, the terminal receives RRC dedicated signaling sent by the access network device, and obtains the first configuration information from the RRC dedicated signaling; or the terminal receives system information sent by the access network device, and obtains the first configuration information from the system information. The system information is broadcast information sent by the access network device.

Optionally, the first configuration information is the preconfigured first configuration information. To be specific, the first configuration information is configuration information that is pre-specified according to a communications protocol related to LTE and that is pre-stored in the terminal. When the first configuration information is the preconfigured first configuration information, the terminal reads the first configuration information stored in the terminal.

Step 202: Determine the first transmission resource pool based on the first configuration information.

Step 203: When a preset condition is met, select a first transmission resource from the first transmission resource pool in a first transmission resource obtaining manner.

Optionally, the preset condition is a condition set based on a specific sending scenario. The specific sending scenario is a scenario in which a transmission resource is selected in a manner in which a transmission resource is selected after channel sensing is performed for sensing duration T2 (where a typical value is 1000 ms); and consequently, V2X message sending fails, or a transmission delay cannot be met.

Optionally, a time spent in selecting the transmission resource in the first transmission resource obtaining manner is less than a transmission delay value of a V2X message. Optionally, the transmission delay value is 100 ms or 20 ms.

3. a carrier sense multiple access with collision avoidance (CSMA/CA) manner.

Step 204: Send a V2X message by using the first transmission resource.

In conclusion, the transmission resource is fast selected in the first transmission resource obtaining manner. Therefore, when the preset condition is met, the first transmission resource is selected from the first transmission resource pool in the first transmission resource obtaining manner, and the V2X message is sent by using the first transmission resource, so as to ensure that the V2X message can be normally transmitted in a specific sending scenario when the preset condition is met.

The foregoing specific sending scenario includes at least two types of scenarios. The following describes an implementation in a first type of scenario in the embodiments of the present invention with reference to FIG. 3 and FIG. 4, and describes an implementation in a second type of scenario in the embodiments of the present invention with reference to FIG. 5 and FIG. 6.

Figure 3:
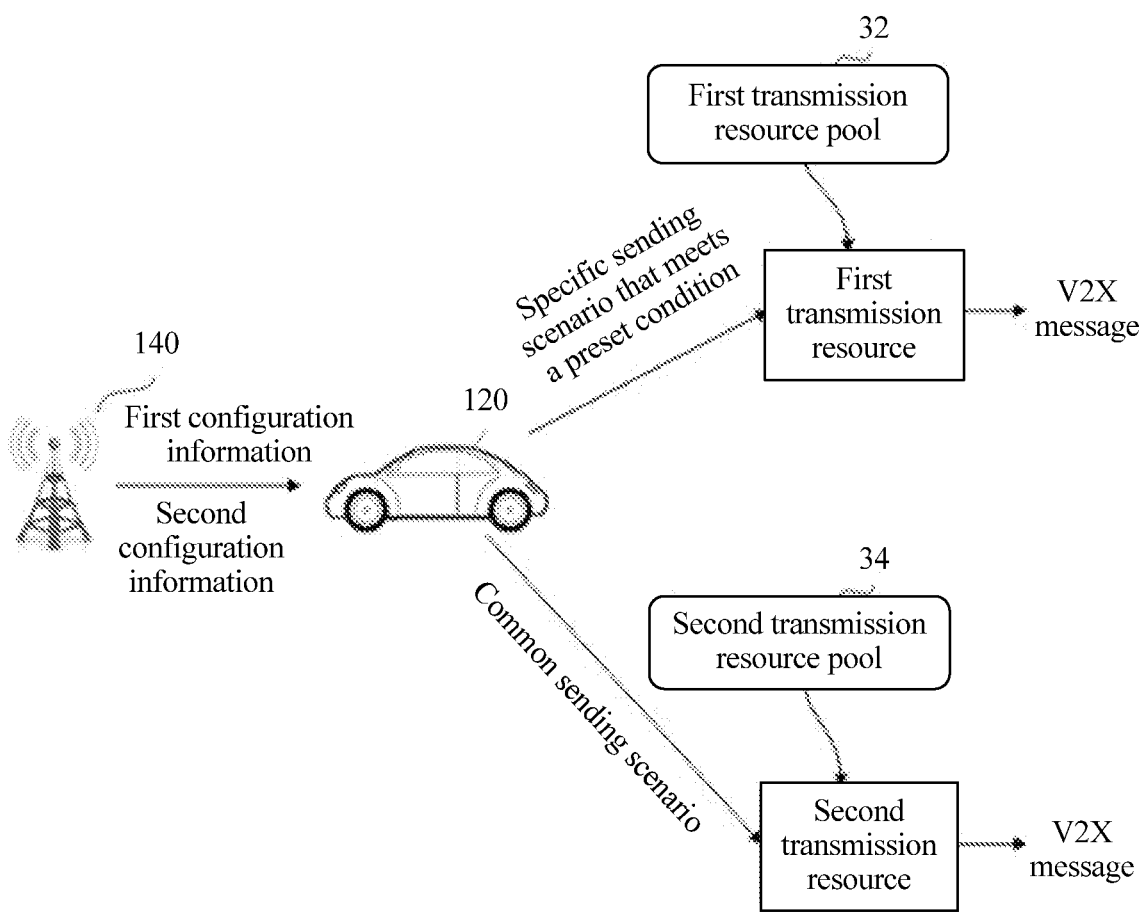
FIG. 3 is a schematic diagram of a principle of a V2X message sending method according to another embodiment of the present invention.

Referring to FIG. 3, an access network device 140 configures a first transmission resource pool 32 and a second transmission resource pool 34 for a terminal 120. In a first type of specific sending scenario, the terminal 120 sends a V2X message by using a transmission resource in the first transmission resource pool 32, and a first transmission resource obtaining manner with a relatively fast selection speed is used in the first transmission resource pool 32. In a common sending scenario, the terminal 120 sends a V2X message by using a transmission resource in the second transmission resource pool 34, and a conventional second transmission resource obtaining manner, namely, a manner in which a transmission resource is selected after channel sensing is performed for sensing duration T2, is used in the second transmission resource pool 34. Optionally, T2=1000 ms.

In this case, a first condition includes: No valid sensing result is obtained from the second transmission resource pool.

Figure 4:
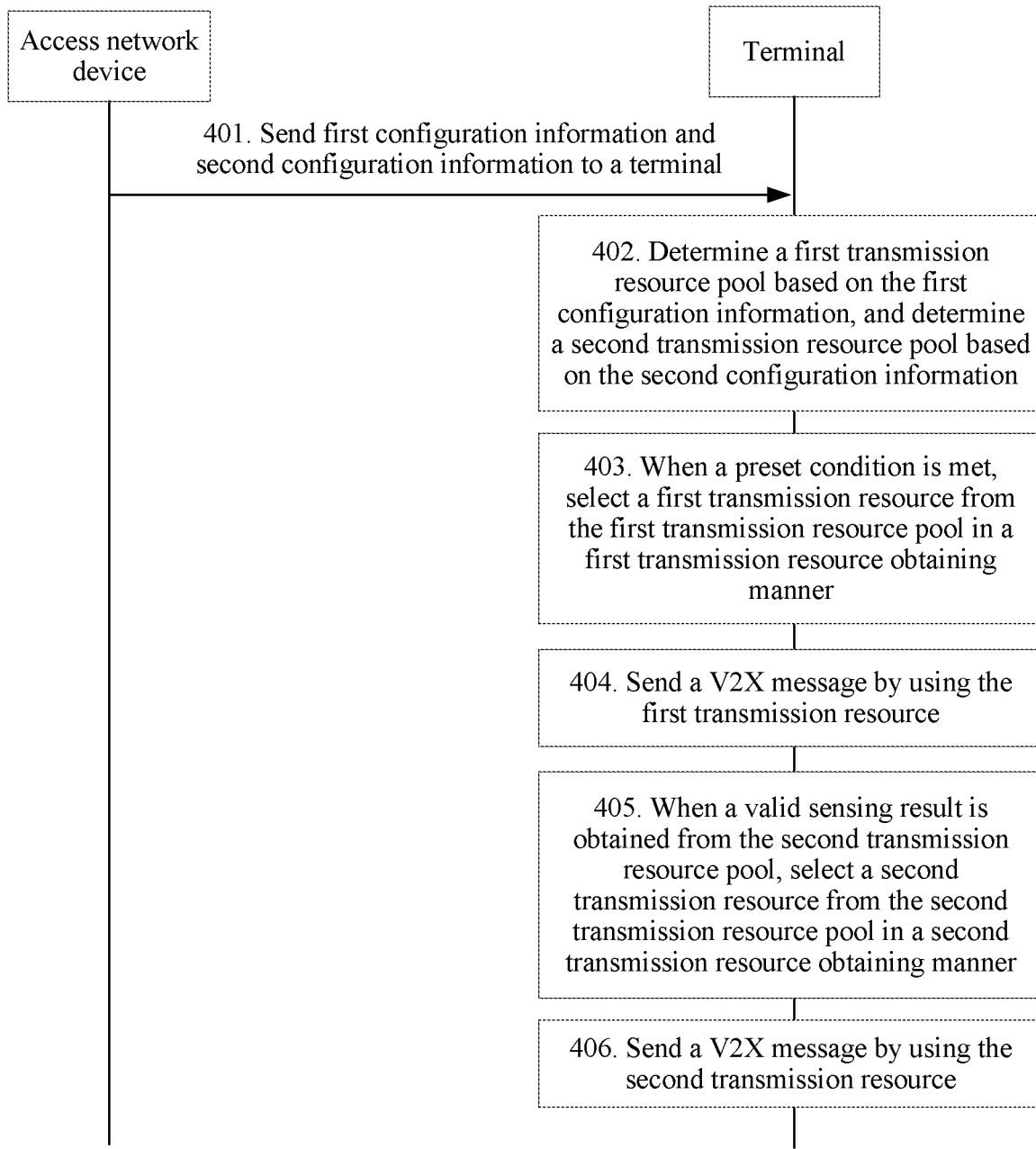
FIG. 4 is a flowchart of a V2X message sending method according to another embodiment of the present invention.

FIG. 4 is a flowchart of a message sending method according to an embodiment of the present invention. An example in which the method is applied to the message sending system shown in FIG. 1 is used for description in this embodiment. The method includes the following steps.

Step 401: An access network device sends first configuration information and second configuration information to a terminal.

The first configuration information is used for determining a first transmission resource pool, and a manner of obtaining a transmission resource from the first transmission resource pool is a first transmission resource obtaining manner. Optionally, the first transmission resource obtaining manner is a random selection manner, a manner in which a transmission resource is selected after channel sensing is performed for sensing duration T1, or a CSMA/CA manner.

The second configuration information is used for determining a second transmission resource pool, and a manner of obtaining a transmission resource from the second transmission resource pool is a second transmission resource obtaining manner. Optionally, the second transmission resource pool obtaining manner is a manner in which a transmission resource is selected after channel sensing is performed for sensing duration T2.

A selection speed of selecting a resource in the first transmission resource obtaining manner is greater than a selection speed of selecting a resource in the second transmission resource obtaining manner.

Optionally, the access network device simultaneously sends the first configuration information and the second configuration information to the terminal; or the access network device first sends the first configuration information to the terminal, and then sends the second configuration information to the terminal; or the access network device first sends the second configuration information to the terminal, and then sends the first configuration information to the terminal.

Optionally, the access network device sends the first configuration information and/or the second configuration information to the terminal by using radio resource control (RRC) dedicated signaling; or the access network device sends the first configuration information and/or the second configuration information to the terminal by using a system information block (SIB) in system information; or the access network device sends the first configuration information and/or the second configuration information to the terminal in a semi-static configuration manner, and the semi-static configuration manner is a configuration manner in which one configuration is valid until next configuration is performed.

Optionally, this step may be omitted when both the access network device and the terminal abide by configuration information that is pre-specified in a communications protocol. The terminal reads an internal memory, and obtains the preconfigured first configuration information and/or the preconfigured second configuration information.

Correspondingly, the terminal receives the first configuration information and the second configuration information sent by the access network device.

Step 402: The terminal determines a first transmission resource pool based on the first configuration information, and determines a second transmission resource pool based on the second configuration information.

Optionally, transmission resources in the first transmission resource pool are completely different from transmission resources in the second transmission resource pool; or transmission resources in the first transmission resource pool are partially the same as and partially different from transmission resources in the second transmission resource pool; or transmission resources in the first transmission resource pool are completely the same as transmission resources in the second transmission resource pool.

When the transmission resources in the first transmission resource pool are completely the same as the transmission resources in the second transmission resource pool, the first configuration information and the second configuration information are same configuration information. Therefore, the access network device needs to send only one piece of configuration information to the terminal. In addition, the first transmission resource pool and the second transmission resource pool are essentially a same transmission resource pool. "First" and "second" are used for description, and are merely used to indicate that different transmission resource obtaining manners are used.

An example in which the transmission resources in the first transmission resource pool are completely different from the transmission resources in the second transmission resource pool is used for description in this embodiment.

Optionally, after determining the second transmission resource pool based on the second configuration information, the terminal starts to continuously sense the transmission resource in the second transmission resource pool.

Step 403: When determining that a preset condition is met, the terminal selects a first transmission resource from the first transmission resource pool in a first transmission resource obtaining manner.

Optionally, the preset condition includes at least one of the following conditions.

1. No valid sensing result is obtained from the second transmission resource pool.

When sensing duration of the terminal in the second transmission resource pool reaches 1000 ms, if all transmission resources are in a busy state, there is no transmission resource in an idle state.

2. Sensing duration in the second transmission resource pool is less than T2.

When the sensing duration in which the terminal senses the transmission resource in the second transmission resource pool does not reach T2, the terminal cannot obtain a valid sensing result. Optionally, T2 is 1000 ms.

3. After the second configuration information is updated, sensing duration in the second transmission resource pool is less than T2.

After the second configuration information is updated, the terminal needs to redetermine a second transmission resource pool. When sensing duration in which the terminal senses a transmission resource in the redetermined second transmission resource pool is less than T2, the terminal cannot obtain a valid sensing result.

4. Synchronization between the terminal and the access network device becomes invalid.

When the synchronization between the terminal and the access network device becomes invalid, a transmission resource cannot be determined, and consequently, the transmission resource in the second transmission resource pool cannot be sensed.

5. After a synchronization source is updated, sensing duration in the second transmission resource pool is less than T2 based on a clock of an updated synchronization source.

For example, the terminal continuously searches for a synchronization source in a running process. When the terminal finds a new synchronization source whose priority is higher than a priority of a currently-used synchronization source, the terminal performs synchronization by using a clock of the synchronization source with a higher priority. When the sensing duration in which the terminal performs sensing in the second transmission resource pool based on the clock of the updated synchronization source is less than T2, the terminal cannot obtain a valid sensing result.

6. A difference between a time at which a V2X message is generated and a time at which the second configuration information is obtained is less than a preset threshold.

7. No transmission resource in an idle state is sensed in the second transmission resource pool.

When sensing duration of the terminal in the second transmission resource pool reaches 1000 ms, if all transmission resources are in a busy state, there is no transmission resource in an idle state.

When determining that any one of the foregoing preset conditions is met, the terminal selects the first transmission resource from the first transmission resource pool in the first transmission resource obtaining manner.

Step 404: The terminal sends a V2X message by using the first transmission resource.

Step 405: When obtaining a valid sensing result from the second transmission resource pool, the terminal selects a second transmission resource from the second transmission resource pool in a second transmission resource obtaining manner.

The second transmission resource obtaining manner is a manner in which a transmission resource is selected after channel sensing is performed for sensing duration T2.

Step 406: The terminal sends a V2X message by using the second transmission resource.

It should be noted that step 405 and step 406 are parallel with step 403 and step 404. When the terminal performs step 403 and step 404, step 405 and step 406 may not be performed. When the terminal performs step 405 and step 406, step 403 and step 404 may not be performed. Optionally, step 405 and step 406 may be performed before step 403 and step 404. This is not limited in this embodiment.

In conclusion, according to the message sending method provided in this embodiment, when a transmission resource is selected, a selection speed in the first transmission resource obtaining manner is faster than a selection speed in the second transmission resource obtaining manner. When the preset condition is met, the first transmission resource is selected from the first transmission resource pool in the first transmission resource obtaining manner, and the V2X message is sent by using the first transmission resource. Therefore, it can be ensured that the V2X message can be normally transmitted in a scenario in which no valid sensing result is obtained from the second transmission resource pool.

Figure 5:
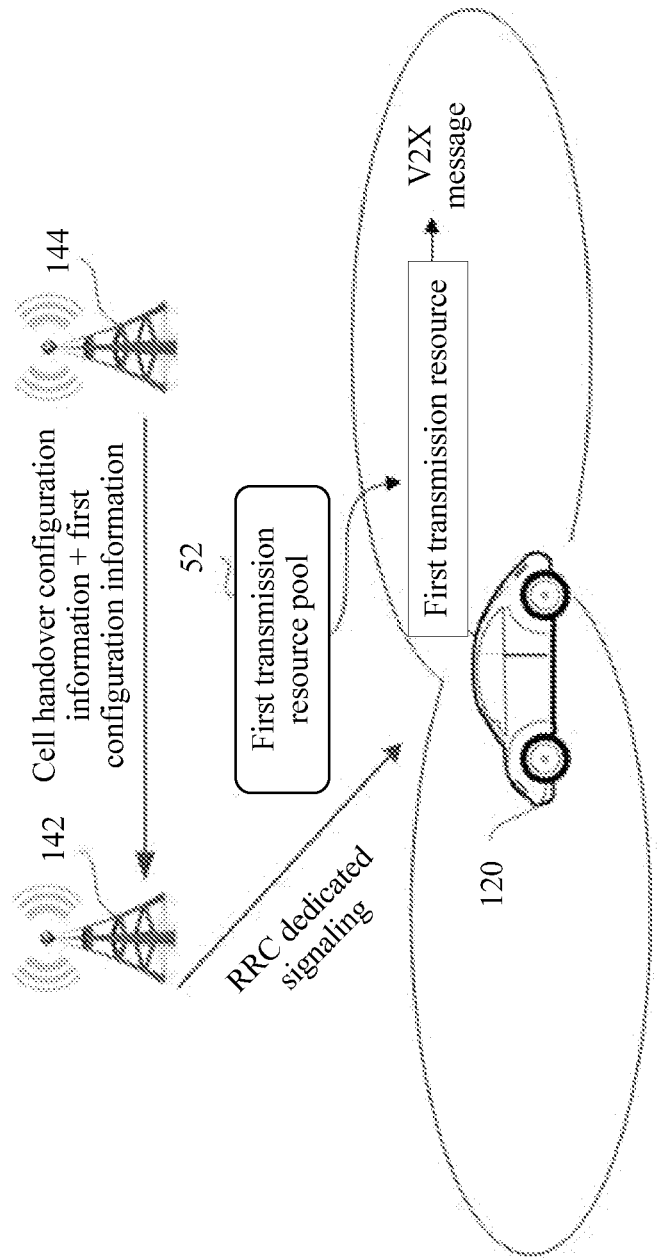
FIG. 5 is a schematic diagram of a principle of a V2X message sending method according to another embodiment of the present invention.

Referring to FIG. 5, when a terminal is in a second type of specific sending scenario (a cell handover scenario), the terminal selects a first transmission resource from a first transmission resource pool in a first transmission resource obtaining manner. It is assumed that when the terminal 120 needs to be handed over from a cell provided by a first access network device 142 to a cell provided by a second access network device 144, the second access network device 144 configures a first transmission resource pool 52 for the terminal. In a cell handover process, the terminal sends a V2X message by using a first transmission resource in the first transmission resource pool 52.

Figure 6:
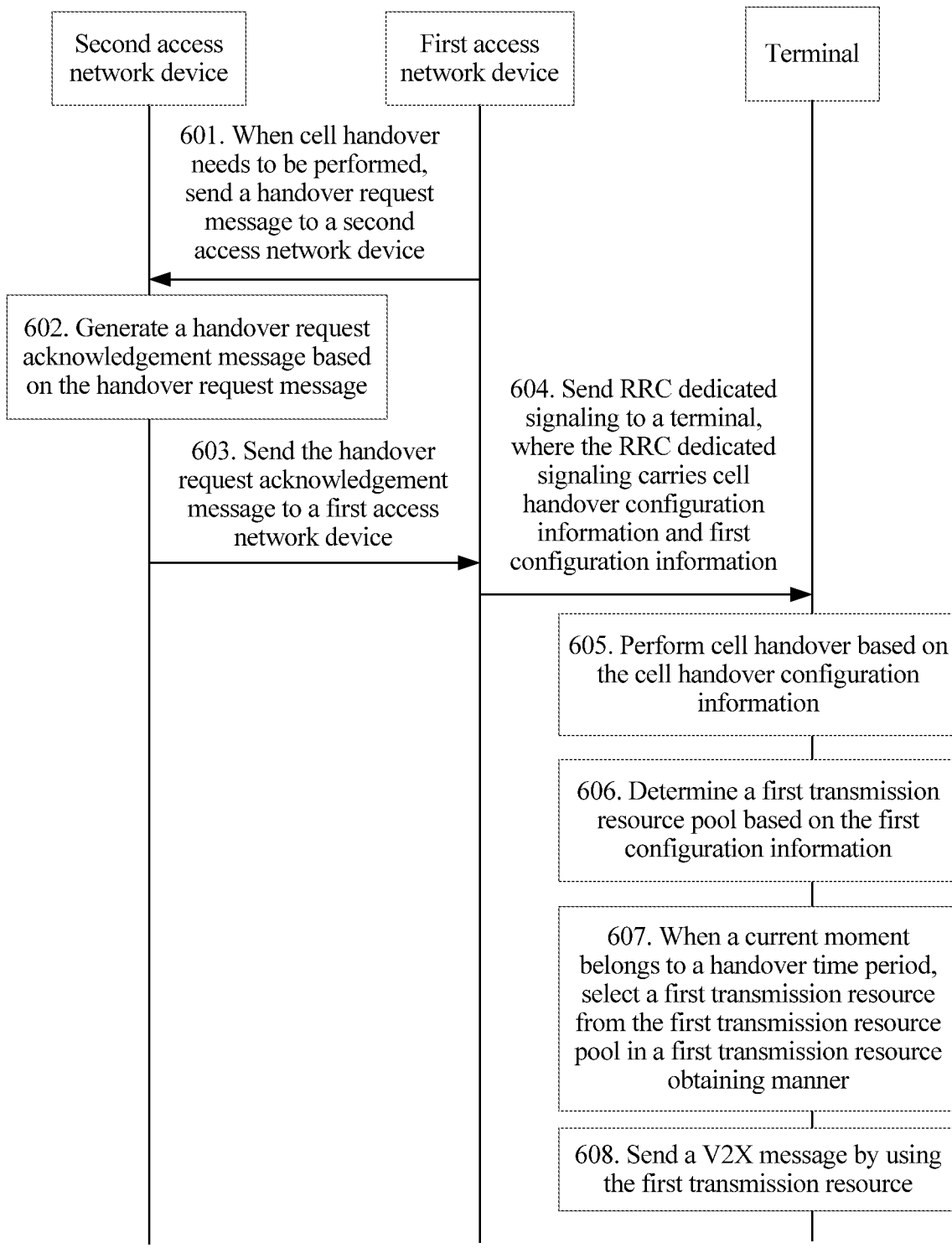
FIG. 6 is a flowchart of a V2X message sending method according to another embodiment of the present invention.

FIG. 6 is a flowchart of a message sending method according to another embodiment of the present invention. The method includes the following steps.

Step 601: When cell handover needs to be performed, a first access network device sends a handover request message to a second access network device.

When a terminal is in an RRC_CONNECTED mode (RRC_CONNECTED), the terminal sends a measurement report of a current cell to the first access network device. The first access network device is an access network device corresponding to a source cell before the handover. The first access network device determines, based on the measurement report sent by the terminal, whether cell handover needs to be performed on the terminal.

When cell handover needs to be performed on the terminal, the first access network device sends a handover request message to the second access network device. The second access network device is an access network device corresponding to a target cell after the handover.

Correspondingly, the second access network device receives the handover request message sent by the first access network device.

Optionally, the handover request message may correspond to different signaling names in different communications systems.

Step 602: The second access network device generates a handover request acknowledgement message based on the handover request message.

When receiving the handover request message, the second access network device determines, depending on a current running status, whether to allow the current cell handover. If the current cell handover is allowed, the second access network device reserves a necessary resource, for example, a bearer resource established between the second access network device and a mobility management entity (MME).

After reserving the necessary resource, the second access network device generates the handover request acknowledgement message, and the handover request acknowledgement message includes cell handover configuration information and first configuration information.

The cell handover configuration information is configuration information related to a current cell handover process, and includes but is not limited to: a physical identifier of the target cell, a cell radio network temporary identifier (C-RNTI) of the terminal in the target cell, a dedicated preamble sequence for accessing the target cell, and a security algorithm of the target cell.

The first configuration information is used for determining a first transmission resource pool, and a manner of obtaining a transmission resource from the first transmission resource pool is a first transmission resource obtaining manner. Optionally, a time spent in selecting a transmission resource in the first transmission resource obtaining manner is less than a transmission delay value of a V2X message.

Optionally, the first transmission resource obtaining manner is a random selection manner, a manner in which a transmission resource is selected after channel sensing is performed for sensing duration T1, or a CSMA/CA manner.

Optionally, the first configuration information may be included in the cell handover configuration information, or the first configuration information and the cell handover configuration information are included in parallel in the handover request acknowledgement message. An inclusion relationship between the first configuration information and the cell handover configuration information is not limited.

Step 603: The second access network device sends the handover request acknowledgement message to the first access network device.

The handover request acknowledgement message carries the cell handover configuration information and the first configuration information.

Correspondingly, the first access network device receives the handover request acknowledgement message sent by the second access network device.

Optionally, the handover request acknowledgement message may correspond to different signaling names in different communications systems. Optionally, the first access network device communicates with the second access network device by using an X2 interface.

Step 604: The first access network device sends RRC dedicated signaling to a terminal, where the RRC dedicated signaling carries cell handover configuration information and first configuration information.

Optionally, the RRC dedicated signaling is RRC connection reconfiguration signaling.

Optionally, the RRC dedicated signaling includes the cell handover configuration information, and the cell handover configuration information includes the first configuration information. That is, the first configuration information is used as a sub-information entry in the cell handover configuration information.

Optionally, the RRC dedicated signaling includes the cell handover configuration information and the first configuration information, and the cell handover configuration information is parallel with the first configuration information.

Correspondingly, the terminal receives the RRC dedicated signaling sent by the first access network device, and obtains the cell handover configuration information and the first configuration information from the RRC dedicated signaling.

Optionally, the first configuration information may be included in the cell handover configuration information, or the first configuration information and the cell handover configuration information are included in parallel in the RRC dedicated signaling. An inclusion relationship between the first configuration information and the cell handover configuration information is not limited.

Optionally, when the terminal receives the RRC dedicated signaling, a T304 timer starts.

Step 605: Perform cell handover on the terminal based on the cell handover configuration information.

Optionally, after the terminal is successfully handed over to the target cell, the T304 timer stops.

Step 606: The terminal determines a first transmission resource pool based on the first configuration information.

Step 607: When a current moment belongs to a handover time period, the terminal selects a first transmission resource from the first transmission resource pool in a first transmission resource obtaining manner.

Optionally, a preset condition includes: The current moment belongs to the handover time period, a start time of the handover time period is a time at which the RRC dedicated signaling is received, and an end time of the handover time period is a time at which the terminal is handed over to the second access network device.

Optionally, the end time of the handover time period is a time at which a cell handover timer stops. For example, the cell handover timer is the T304 timer.

The handover time period may also be considered as a running time period of the cell handover timer.

When determining that the preset condition is met, the terminal selects the first transmission resource from the first transmission resource pool in the first transmission resource obtaining manner.

The first transmission resource obtaining manner is a random selection manner, a manner in which a transmission resource is selected after channel sensing is performed for sensing duration T1, or a CSMA/CA manner.

Step 608: The terminal sends a V2X message by using the first transmission resource.

It should be noted that there is no necessary sequence between step 605 and step 606. In this embodiment, an example in which step 605 is performed before step 606 is used only for description. Alternatively, step 605 may be performed after step 606, or step 605 and step 606 are simultaneously performed. This is not limited in this embodiment.

In conclusion, according to the message sending method provided in this embodiment, when a transmission resource is selected, a selection speed in the first transmission resource obtaining manner is relatively fast. When the preset condition is met, the first transmission resource is selected from the first transmission resource pool in the first transmission resource obtaining manner, and the V2X message is sent by using the first transmission resource. Therefore, it can be ensured that the V2X message can be normally transmitted in a cell handover scenario of the terminal.

In an optional implementation provided based on the embodiment of FIG. 6, the first access network device sends second configuration information to the terminal. The terminal determines a second transmission resource pool based on the second configuration information. When cell handover does not need to be performed, the terminal obtains a second transmission resource from the second transmission resource pool in a second transmission resource obtaining manner, and sends the V2X message by using the second transmission resource.

In an optional implementation provided based on the embodiment of FIG. 6, the terminal reads an internal memory, and obtains preconfigured second configuration information. The terminal determines a second transmission resource pool based on the second configuration information. When cell handover does not need to be performed, the terminal obtains a second transmission resource from the second transmission resource pool in a second transmission resource obtaining manner, and sends the V2X message by using the second transmission resource.

With reference to the foregoing method embodiments:

Optionally, the random selection manner is as follows: The terminal randomly selects some transmission resources from n transmission resources in the first transmission resource pool as the first transmission resources. Optionally, a specific quantity of some transmission resources is dynamically determined by a data volume of a to-be-sent V2X message.

Optionally, the manner in which a transmission resource is selected after channel sensing is performed for sensing duration T1 is as follows: The terminal continuously senses n transmission resources in the second transmission resource pool, and duration of the continuous sensing is at least T1; and the terminal determines, based on a result of the continuous sensing, a transmission resource in an idle state.

Optionally, the manner in which a transmission resource is selected after channel sensing is performed for sensing duration T2 is as follows: The terminal continuously senses n transmission resources in the first transmission resource pool, and duration of the continuous sensing is at least T2; and the terminal determines, based on a result of the continuous sensing, a transmission resource in an idle state. For example, T2 is less than T1.

Optionally, the continuous sensing is as follows: The terminal detects signal energy received on the n transmission resources; and when the signal energy is greater than a threshold, determines that the transmission resource is in a busy state; or when the signal energy is less than a threshold, determines that the transmission resource is in an idle state. Alternatively, the continuous sensing is as follows. The terminal decodes a signal that is received on the n transmission resources; and when valid information is obtained through decoding, determines that the transmission resource is in a busy state; or when no valid information is obtained through decoding, determines that the transmission resource is in an idle state. Optionally, transmission resources are divided in a unit of a resource block; or divided in a unit of a subframe; or divided in a unit of m symbols, where m=1, 2, 3, or 4.

Optionally, for the CSMA/CA manner, refer to the 802.11 protocol standard formulated by the Institute of Electrical and Electronics Engineers (IEEE).

Optionally, the transmission resource in the foregoing embodiments is also referred to as a time-frequency resource. The time-frequency resource includes a time domain resource and a frequency domain resource.

Optionally, for a manner in which a transmission resource is selected after channel sensing is performed for sensing duration T1 or T2, a transmission resource is selected from a transmission resource pool based on service priority information. Specifically, when the V2X message enters a logical channel of an access layer, the logical channel has a corresponding service priority. The service priority may be obtained by using a corresponding primitive of the V2X message, or may be obtained through configuration or preconfiguration by a base station. Optionally, V2X messages with different service priorities may enter different logical channels. A media access control (MAC) layer determines a first transmission priority based on a service priority of a logical channel having a V2X service, and notifies a physical layer of the first transmission priority. The physical layer determines a valid transmission resource set based on the first transmission priority and the result of the continuous sensing, and notifies the MAC layer of the valid transmission resource set, so that the MAC layer determines, based on the valid transmission resource set, a transmission resource used for sending the V2X service.

Optionally, when the V2X service is transmitted, a MAC layer of a sending terminal sends, to a physical layer, a second transmission priority and a media access control protocol data unit (MAC PDU) in which the V2X service is encapsulated, so that the physical layer encapsulates the second transmission priority in an scheduling assignment (SA) corresponding to the MAC PDU and sends the SA. After receiving the SA, a physical layer of a nearby receiving terminal determines a service priority of the MAC PDU based on the second transmission priority obtained through decoding. Optionally, the second transmission priority is a highest service priority in service priorities corresponding to all logical channel data encapsulated in the MAC PDU.

Optionally, for the sending terminal, the first transmission priority is equal to the second transmission priority.

Optionally, the MAC PDU used for transmitting the V2X service on a direct link uses a first transmission format. Specifically, a header of the MAC PDU carries a source address and a target address. A length of bits occupied by the source address of the MAC PDU is equal to a length of bits occupied by the target address of the MAC PDU. Typically, the bits are 24 bits. Optionally, the MAC PDU needs to carry first format indication information. The first format indication information is used to notify the receiving terminal that the MAC PDU uses the first transmission format. Optionally, the SA used for transmitting the V2X service on a direct link uses a second transmission format. Specifically, the SA does not carry a truncated destination address. Optionally, the SA needs to carry second format indication information. The second format indication information is used to notify the receiving terminal that the SA uses the second transmission format.

Optionally, the time domain resource is a symbol, a symbol group, a timeslot (slot), or a subframe. The timeslot is a 0.5-ms timeslot in an LTE system with 15-kHz subcarrier spacing, or a timeslot in a communications system with larger subcarrier spacing. The subframe is a 1-ms subframe in an LTE system with 15-kHz subcarrier spacing, or a subframe in a communications system with larger subcarrier spacing. This is not limited in this embodiment.

Optionally, the frequency domain resource is a PRB, a physical resource block group (RBG), a virtual resource block (VRB), a subcarrier, or a subcarrier group. The PRB and the VRB are basic units for resource allocation in different meanings. The PRB is 12 consecutive subcarriers in frequency domain and resources of one timeslot in time domain. A definition of the VRB is the same as a definition of the PRB during centralized resource allocation, and the VRB corresponds to the PRB during distributed resource allocation. A PRB index is a PRB index, and a VRB index is a VRB index. Therefore, the PRB index may be different from the VRB index. The RBG may include a plurality of PRBs, and a quantity of PRBs included in the RBG is determined based on bandwidth of the terminal, or is obtained based on an indication of a network device. The PRB index may be a PRB number, an RBG index may be an RBG number, the VRB index may be a VRB number, a subcarrier index may be a subcarrier number, and a subcarrier group index may be a subcarrier group number. The subcarrier group includes at least one subcarrier.

Figure 7:
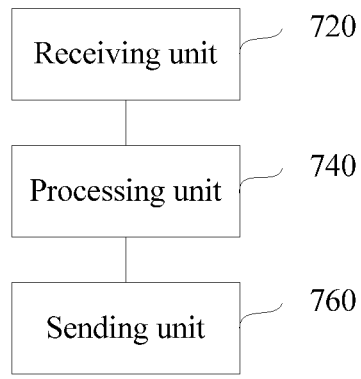
FIG. 7 is a block diagram of a V2X message sending apparatus according to an embodiment of the present invention.

FIG. 7 is a block diagram of a message sending apparatus according to an embodiment of the present invention. The message sending apparatus may be implemented as all or a part of a terminal by using a dedicated hardware circuit or a combination of software and hardware. The message sending apparatus includes a receiving unit 720, a processing unit 740, and a sending unit 760.

The processing unit 740 is configured to obtain first configuration information, where the first configuration information is used for determining a first transmission resource pool.

The processing unit 740 is configured to determine the first transmission resource pool based on the first configuration information.

The processing unit 740 is configured to select a first transmission resource from the first transmission resource pool in a first transmission resource obtaining manner when determining that a preset condition is met.

The sending unit 760 is configured to send the V2X message by using the first transmission resource.

In an optional embodiment, the receiving unit 720 is configured to receive RRC dedicated signaling sent by a first access network device; the processing unit 740 is configured to obtain cell handover configuration information and first configuration information from the RRC dedicated signaling, where the cell handover configuration information and the first configuration information are configured by a second access network device; and the processing unit 740 is further configured to hand over the apparatus from a source cell to a target cell based on the cell handover configuration information.

The first access network device is an access network device corresponding to the source cell, and the second access network device is an access network device corresponding to the target cell.

Optionally, the preset condition includes a current moment belongs to a handover time period, a start time of the handover time period is a time at which the RRC dedicated signaling is received, and an end time of the handover time period is a time at which the apparatus is handed over to the target cell.

In another optional embodiment, the processing unit 740 is further configured to obtain second configuration information, where the second configuration information is used for determining a second transmission resource pool, a manner of obtaining a transmission resource from the second transmission resource pool is a second transmission resource obtaining manner, and the second transmission resource obtaining manner is a transmission resource obtaining manner in which a transmission resource is selected after channel sensing is performed for sensing duration T2; and the processing unit 740 is further configured to determine the second transmission resource pool based on the second configuration information.

Optionally, the preset condition includes at least one of the following conditions no valid sensing result is obtained from the second transmission resource pool; sensing duration in the second transmission resource pool is less than T2; after the second configuration information is updated, sensing duration in the second transmission resource pool is less than T2; synchronization between the apparatus and the access network device becomes invalid; after a synchronization source is updated, sensing duration in the second transmission resource pool is less than T2 based on a clock of an updated synchronization source; a difference between a time at which the V2X message is generated and a time at which the second configuration information is obtained is less than a preset threshold; or no transmission resource in an idle state is sensed in the second transmission resource pool.

In another optional embodiment, the processing unit 740 is further configured to: when obtaining a valid sensing result from the second transmission resource pool, obtain a second transmission resource from the second transmission resource pool in the second transmission resource obtaining manner; and the sending unit 760 is further configured to send the V2X message by using the second transmission resource.

In an optional embodiment, the first transmission resource pool and the second transmission resource pool are a same resource pool, and the first transmission resource obtaining manner is different from the second transmission resource obtaining manner.

In an optional embodiment, the processing unit 740 is configured to obtain the preconfigured first configuration information; or the receiving unit 720 is configured to receive radio resource control RRC dedicated signaling sent by the access network device, and the processing unit is configured to obtain the first configuration information from the RRC dedicated signaling; or the receiving unit 720 is configured to receive system information sent by the access network device, and the processing unit is configured to obtain the first configuration information from the system information.

In an optional embodiment, the first transmission resource obtaining manner includes any one of the following manners: a random selection manner; a manner in which a transmission resource is selected after channel sensing is performed for sensing duration T1, where the sensing duration T1 is less than a transmission delay value of the V2X message; or a carrier sense multiple access with collision avoidance CSMA/CA manner.

For related details, refer to the method embodiment described in FIG. 2, FIG. 4, or FIG. 6.

It should be noted that the receiving unit 720 may be implemented by a receiver, or implemented by a combination of a processor and a receiver. The processing unit 720 may be implemented by a processor. The sending unit 740 may be implemented by a transmitter, or implemented by a combination of a processor and a transmitter.

Figure 8:
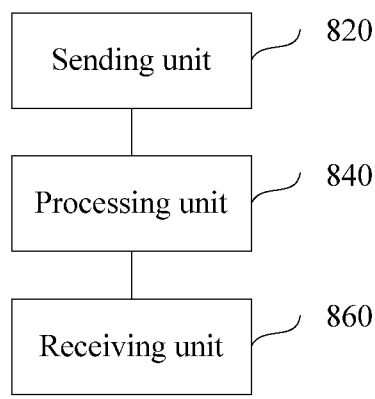
FIG. 8 is a block diagram of a V2X message sending apparatus according to another embodiment of the present invention.

FIG. 8 is a block diagram of a message sending apparatus according to another embodiment of the present invention. The message sending apparatus may be implemented as all or a part of an access network terminal or a first access network device by using a dedicated hardware circuit or a combination of software and hardware. The message sending apparatus includes a sending unit 820, a processing unit 840, and a receiving unit 860.

The processing unit 840 is configured to generate first configuration information.

The sending unit 820 is configured to send the first configuration information to a terminal, where the first configuration information is used for determining a first transmission resource pool.

The terminal is configured to: determine the first transmission resource pool based on the first configuration information; when determining that a preset condition is met, select a first transmission resource from the first transmission resource pool in a first transmission resource obtaining manner; and send the V2X message by using the first transmission resource.

In an optional embodiment, the sending unit 820 is configured to: when cell handover needs to be performed on the terminal, send a handover request message to a second access network device, where the second access network device is an access network device corresponding to a target cell; the receiving unit 860 is configured to receive a handover acknowledgement message sent by the second access network device, where the handover acknowledgement message includes cell handover configuration information and the first configuration information; the processing unit 840 is configured to generate RRC dedicated signaling based on the handover acknowledgement message; the sending unit 820 is configured to send the RRC dedicated signaling to the terminal, where the RRC dedicated signaling includes the cell handover configuration information and the first configuration information, and the terminal is configured to: be handed over from a source cell to the target cell based on the cell handover configuration information, select the first transmission resource from the first transmission resource pool in the first transmission resource obtaining manner within a handover time period, and send the V2X message by using the first transmission resource.

In an optional embodiment, the processing unit 840 is configured to generate second configuration information; the sending unit 820 is configured to send the second configuration information to the terminal, where the second configuration information is used for determining a second transmission resource pool, a manner of obtaining a transmission resource from the second transmission resource pool is a second transmission resource obtaining manner, and the second transmission resource obtaining manner is a transmission resource obtaining manner in which a transmission resource is selected after channel sensing is performed for sensing duration T2.

In an optional embodiment, the sending unit 820 is configured to send radio resource control RRC dedicated signaling to the terminal, where the RRC dedicated signaling carries the first configuration information. Alternatively, the sending unit 820 is configured to send system information to the terminal, where the system information carries the first configuration information.

For related details, refer to the method embodiment described in FIG. 4 or FIG. 6.

It should be noted that the sending unit 820 may be implemented by a transmitter, or implemented by a combination of a processor and a transmitter. The processing unit 840 may be implemented by a processor. The receiving unit 860 may be implemented by a receiver Rx, or implemented by a combination of a processor and a receiver.

Figure 9:
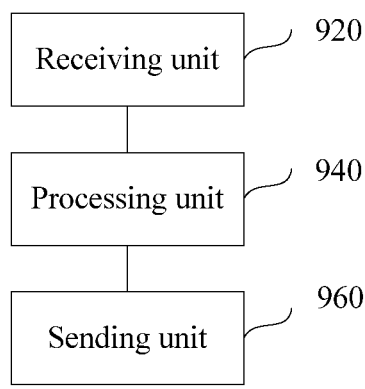
FIG. 9 is a block diagram of a V2X message sending apparatus according to another embodiment of the present invention.

FIG. 9 is a block diagram of a message sending apparatus according to another embodiment of the present invention. The message sending apparatus may be implemented as all or a part of a second access network device by using a dedicated hardware circuit or a combination of software and hardware. The message sending apparatus includes a receiving unit 920, a processing unit 940, and a sending unit 960.

The receiving unit 920 is configured to receive a handover request message sent by a first access network device, where the handover request message is sent by the first access network device when cell handover needs to be performed on a terminal, and the first access network device is an access network device corresponding to a source cell.

The processing unit 940 is configured to generate a handover request response message based on the handover request message.

The sending unit 960 is configured to send the handover request response message to the first access network device, where the handover request response message carries cell handover configuration information and first configuration information, and the first configuration information is used for determining a first transmission resource pool.

The first access network device is configured to send radio resource control RRC dedicated signaling to the terminal, where the RRC dedicated signaling includes the cell handover configuration information and the first configuration information; and the terminal is configured to: be handed over from the source cell to a target cell based on the cell handover configuration information, select a first transmission resource from the first transmission resource pool in the first transmission resource obtaining manner within a handover time period, and send the V2X message by using the first transmission resource.

In an optional embodiment, the first transmission resource obtaining manner includes any one of the following manners: a random selection manner; a manner in which a transmission resource is selected after channel sensing is performed for sensing duration T1, where the sensing duration T1 is less than a transmission delay value of the V2X message; or a carrier sense multiple access with collision avoidance CSMA/CA manner.

For related details, refer to the method embodiment described in FIG. 6.

It should be noted that the receiving unit 920 may be implemented by a receiver, or implemented by a combination of a processor and a receiver. The processing unit 940 may be implemented by a processor. The sending unit 960 may be implemented by a transmitter, or implemented by a combination of a processor and a transmitter.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, an optical disc, or the like.

The foregoing descriptions are merely example embodiments of the present invention, but are not intended to limit the present invention. Any modification, equivalent replacement, and improvement made without departing from the spirit and principle of the present invention shall fall within the protection scope of the present invention.

What is claimed is:

1. A V2X message transmission method, wherein the method comprises:
    obtaining, by a terminal apparatus, first configuration information and second configuration information, wherein the first configuration information is used for determining a first transmission resource pool, the second configuration information is used for determining a second transmission resource pool, a manner of obtaining a transmission resource from the second transmission resource pool is a second transmission resource obtaining manner, and the second transmission resource obtaining manner is a transmission resource obtaining manner in which a transmission resource is selected after channel sensing is performed for sensing duration T2;
    determining, by the terminal apparatus, the first transmission resource pool based on the first configuration information;
    selecting, by the terminal apparatus, a first transmission resource from the first transmission resource pool in a first transmission resource obtaining manner when a sensing duration in the second transmission resource pool is less than T2, wherein the first transmission resource obtaining manner comprises a random selection manner; and
    sending, by the terminal apparatus, a V2X message by using the first transmission resource.

2. The method according to claim 1, wherein the obtaining, by a terminal apparatus, first configuration information comprises:

receiving, by the terminal apparatus, radio resource control (RRC) dedicated signaling from a first access network apparatus; and obtaining, by the terminal apparatus, cell handover configuration information and first configuration information from the RRC dedicated signaling, wherein the cell handover configuration information and the first configuration information are configured by a second access network apparatus; and the method further comprises:

handing over the terminal apparatus from a source cell to a target cell based on the cell handover configuration information, wherein:

the first access network apparatus is an access network device corresponding to the source cell, and the second access network apparatus is an access network device corresponding to the target cell.

3. The method according to claim 1, wherein the method further comprises:

determining, by the terminal apparatus, the second transmission resource pool based on the second configuration information;

obtaining, by the terminal apparatus, a second transmission resource from the second transmission resource pool in the second transmission resource obtaining manner, when obtaining a valid sensing result in T2 from the second transmission resource pool; and sending, by the terminal apparatus, the V2X message by using the second transmission resource.

4. The method according to claim 1, wherein
the first configuration information is carried in system information.

5. A configuration information sending method, wherein the method comprises:

sending, by a first access network apparatus, second configuration information to a terminal apparatus, the second configuration information is used for determining a second transmission resource pool, a manner of obtaining a transmission resource from the second transmission resource pool is a second transmission resource obtaining manner, and the second transmission resource obtaining manner is a transmission resource obtaining manner in which a transmission resource is selected after channel sensing is performed for sensing duration T2; and sending, by the first access network apparatus, first configuration information to the terminal apparatus, wherein the first configuration information is used for determining a first transmission resource pool, wherein the first transmission resource pool is used for selecting a first transmission resource in a first transmission resource obtaining manner when a sensing duration in the second transmission resource pool is less than T2, wherein the first transmission resource obtaining manner comprises a random selection manner, and the first transmission resource is used for sending a V2X message.

6. The method according to claim 5, wherein the first access network apparatus is an access network apparatus corresponding to a source cell; and the sending, by the first access network apparatus, first configuration information to a terminal apparatus comprises:

when cell handover needs to be performed on the terminal apparatus, sending, by the first access network apparatus, a handover request message to a second access network apparatus, wherein the second access network apparatus is an access network apparatus corresponding to a target cell;

receiving, by the first access network apparatus, a handover acknowledgement message from the second access network apparatus, wherein the handover acknowledgement message comprises cell handover configuration information and the first configuration information; and sending, by the first access network apparatus, radio resource control (RRC) dedicated signaling to the terminal apparatus, wherein the RRC dedicated signaling comprises the cell handover configuration information and the first configuration information, and the cell handover configuration information is used for handing over from the source cell to the target cell, the first transmission resource pool is used for selecting the first transmission resource in the first transmission resource obtaining manner within a handover time period, and the first transmission resource is used for sending the V2X message.

7. The method according to claim 5, wherein
the first configuration information is carried in system information.

8. A terminal apparatus, wherein the apparatus comprises:

a receiver, configured to obtain first configuration information and second configuration information, wherein the first configuration information is used for determining a first transmission resource pool, the second configuration information is used for determining a second transmission resource pool, a manner of obtaining a transmission resource from the second transmission resource pool is a second transmission resource obtaining manner, and the second transmission resource obtaining manner is a transmission resource obtaining manner in which a transmission resource is selected after channel sensing is performed for sensing duration T2;

a processor, configured to determine the first transmission resource pool based on the first configuration information;

the processor, further configured to select a first transmission resource from the first transmission resource pool in the first transmission resource obtaining manner when a sensing duration in the second transmission resource pool is less than T2, wherein the first transmission resource obtaining manner comprises a random selection manner; and a transmitter, configured to send a V2X message by using the first transmission resource.

9. The apparatus according to claim 8, wherein:

the receiver, configured to receive radio resource control (RRC) dedicated signaling from a first access network apparatus;

the processor, configured to obtain cell handover configuration information and first configuration information from the RRC dedicated signaling, wherein the cell handover configuration information and the first configuration information are configured by a second access network apparatus; and the processor, configured to hand over the terminal apparatus from a source cell to a target cell based on the cell handover configuration information, wherein the first access network apparatus is an access network device corresponding to the source cell, and the second access network apparatus is an access network device corresponding to the target cell.

10. The apparatus according to claim 8, wherein:
the processor, further configured to determine the second transmission resource pool based on the second configuration information;
the processor, further configured to obtain a second transmission resource from the second transmission resource pool in the second transmission resource obtaining manner, when obtaining a valid sensing result in T2 from the second transmission resource pool; and
the transmitter, further configured to send the V2X message by using the second transmission resource.

11. The apparatus according to claim 8, wherein the first configuration information is carried in system information.

12. A first access network apparatus, wherein the apparatus comprises a processor and a transmitter connected to the processor, wherein:
a transmitter, configured to send second configuration information to a terminal apparatus, the second configuration information is used for determining a second transmission resource pool, a manner of obtaining a transmission resource from the second transmission resource pool is a second transmission resource obtaining manner, and the second transmission resource obtaining manner is a transmission resource obtaining manner in which a transmission resource is selected after channel sensing is performed for sensing duration T2; and
the transmitter, further configured to send first configuration information to the terminal apparatus, wherein the first configuration information is used for determining a first transmission resource pool, wherein the first transmission resource pool is used for selecting a first transmission resource in a first transmission resource obtaining manner when sensing duration in the second transmission resource pool is less than T2, wherein the first transmission resource obtaining manner comprises a random selection manner, and the first transmission resource is used for sending a V2X message.

13. The apparatus according to claim 12, wherein the apparatus further comprises a receiver, wherein:
the transmitter, further configured to: when cell handover needs to be performed on the terminal apparatus, send a handover request message to a second access network apparatus, wherein the second access network apparatus is an access network apparatus corresponding to a target cell;
the receiver, configured to receive a handover acknowledgement message from the second access network apparatus, wherein the handover acknowledgement message comprises cell handover configuration information and the first configuration information; and
the transmitter, further configured to send radio resource control (RRC) dedicated signaling to the terminal apparatus, wherein the RRC dedicated signaling comprises the cell handover configuration information and the first configuration information, and the cell handover configuration information is used for handing over from a source cell to the target cell, the first transmission resource pool is used for selecting the first transmission resource in the first transmission resource obtaining manner within a handover time period, and the first transmission resource is used for sending the V2X message.

14. The apparatus according to claim 12, wherein:
the first configuration information is carried in system information.

* * * * *